No. 666,412. Patented Jan. 22, 1901.
J. DONEGAN.
LINOTYPE MACHINE.
(Application filed Aug. 4, 1899.)
(No Model.) 10 Sheets—Sheet 2.
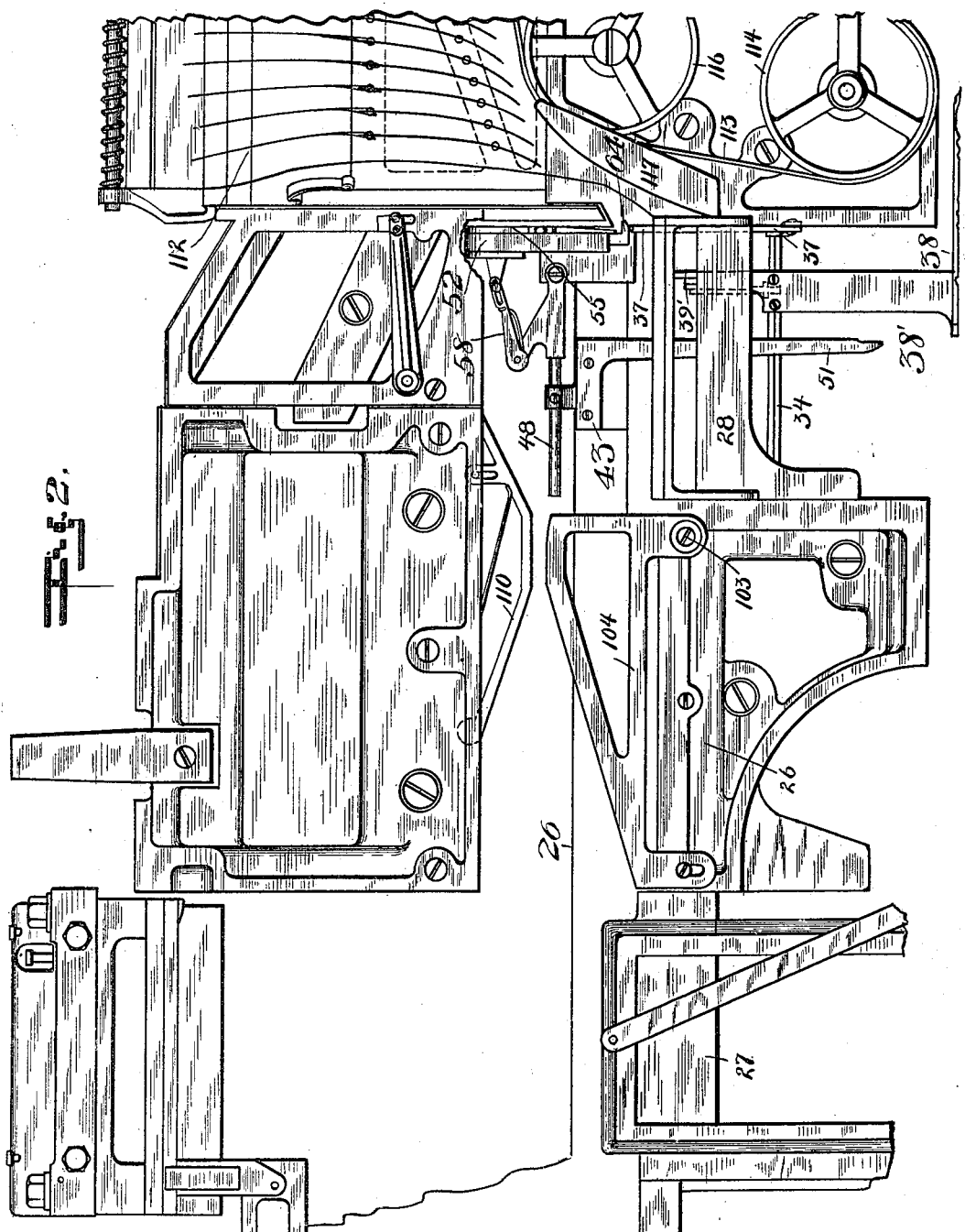

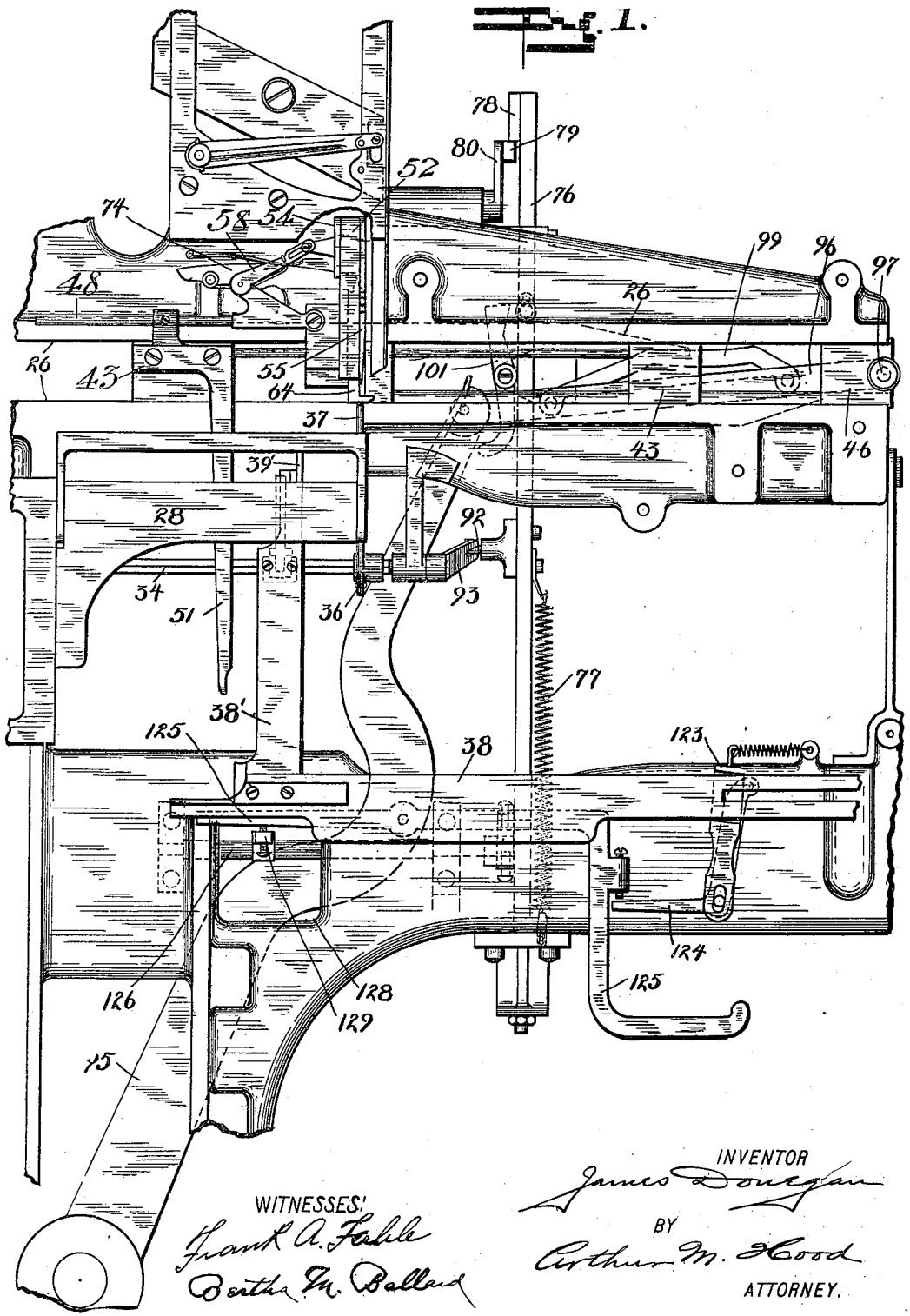

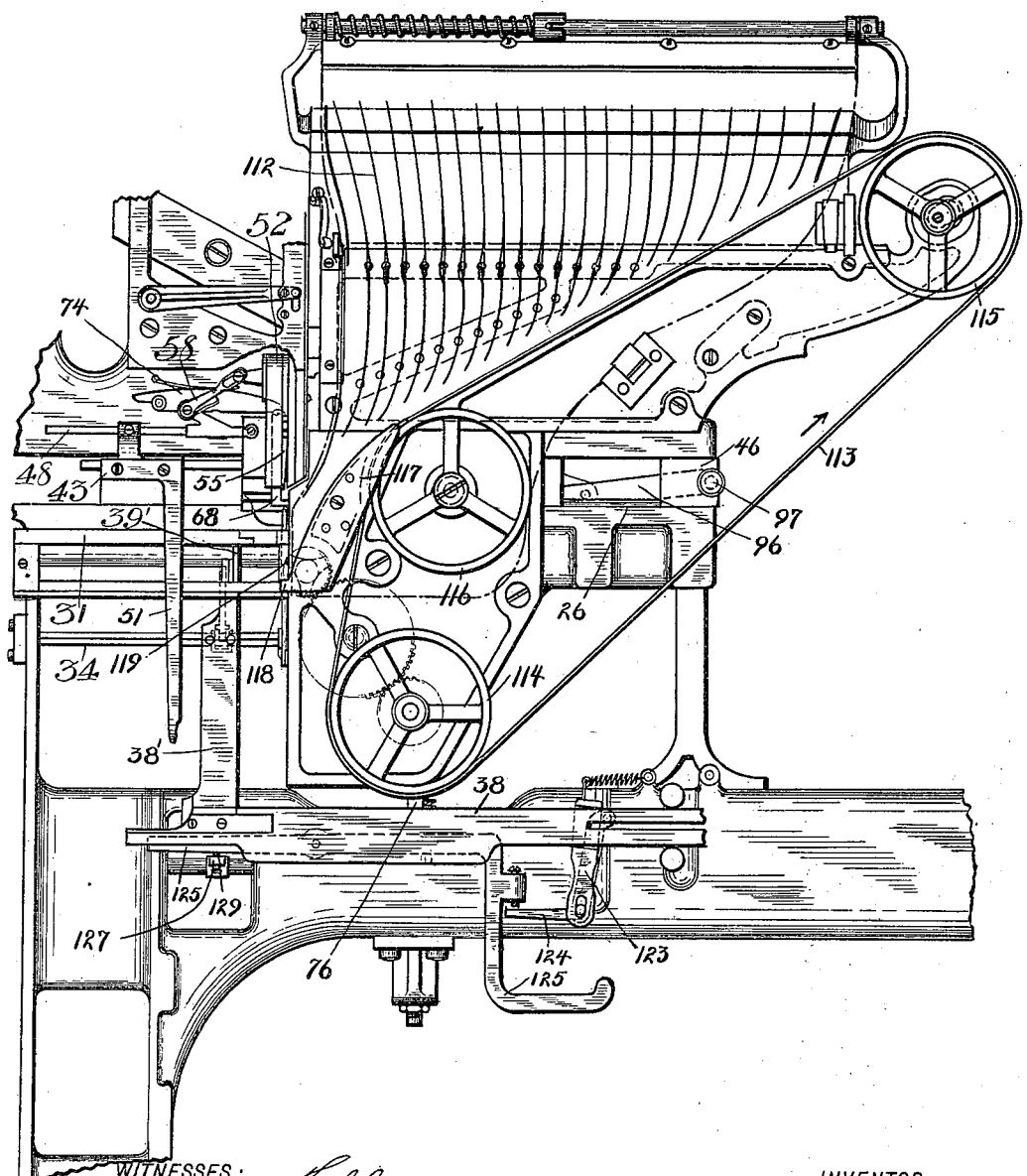

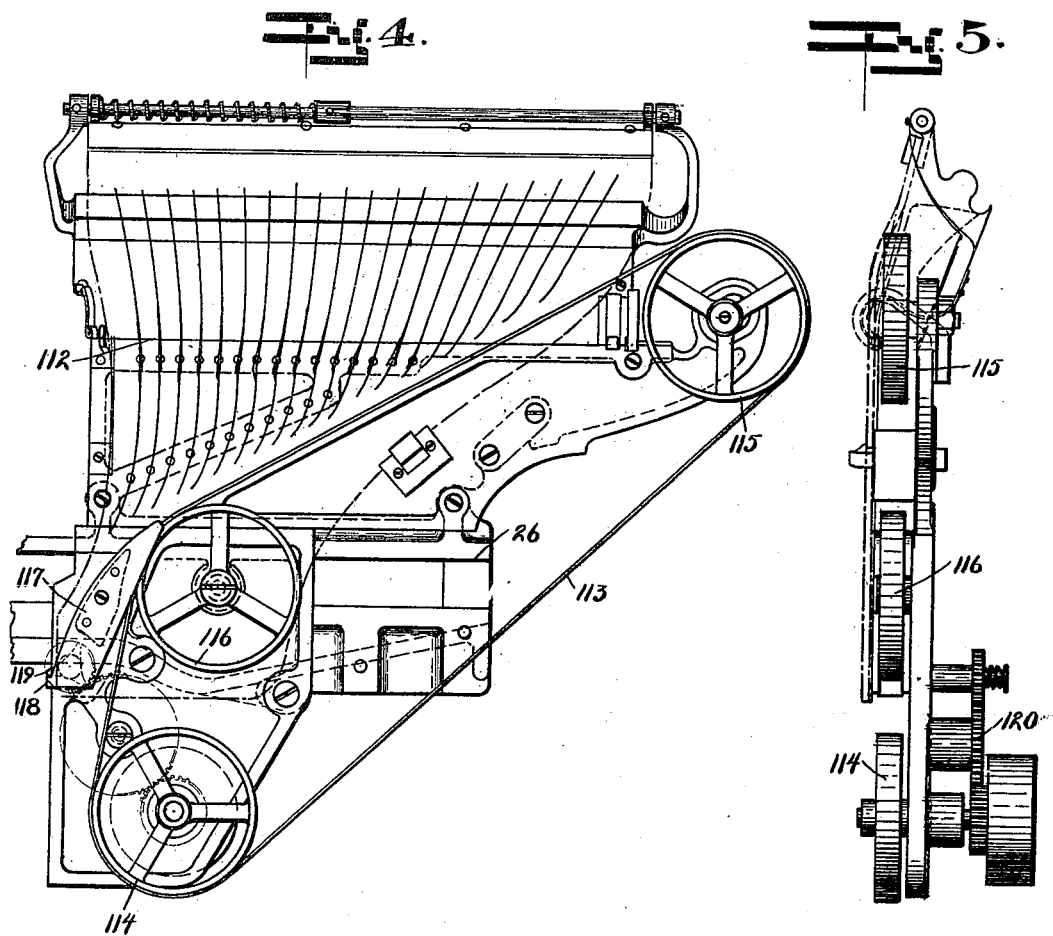

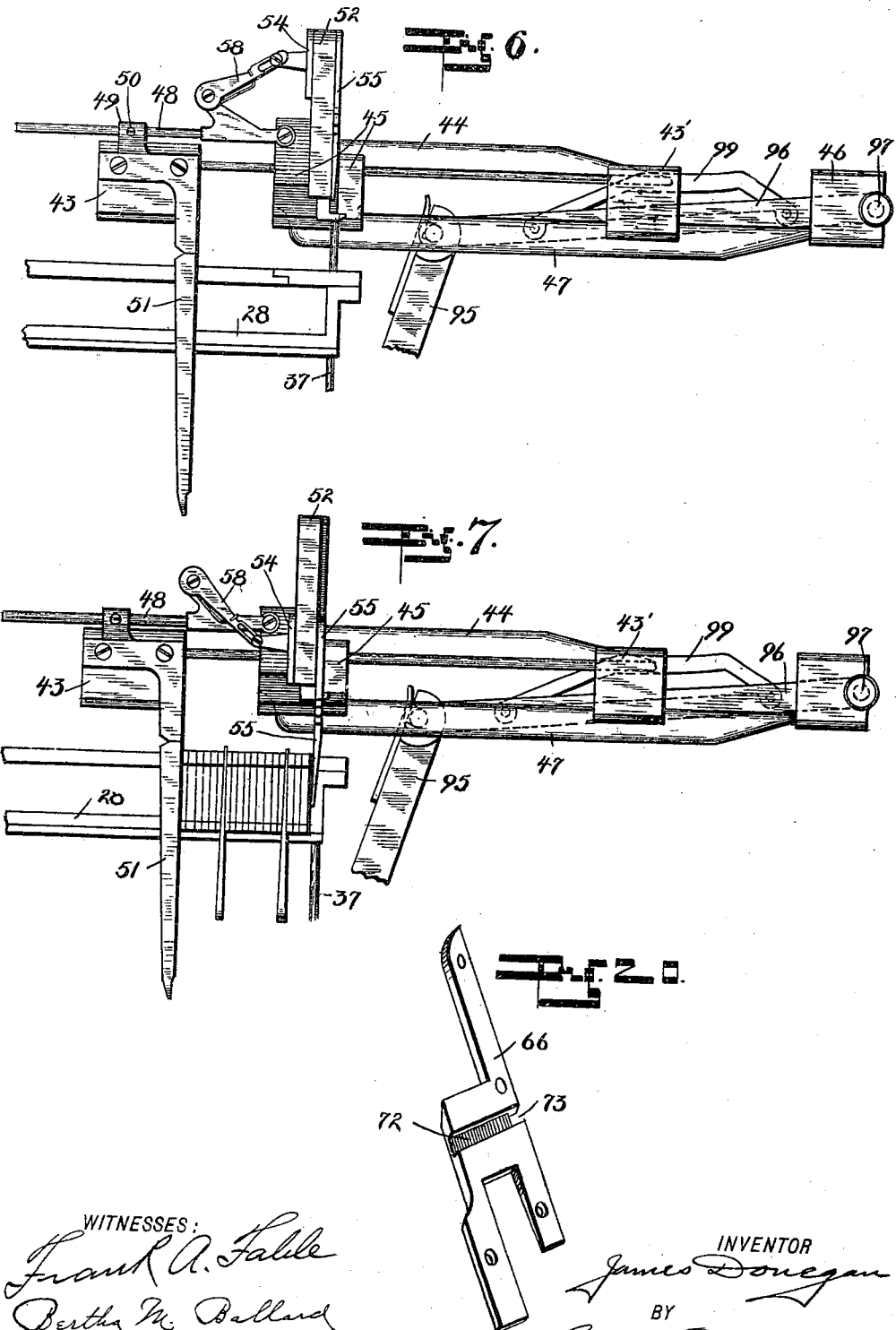

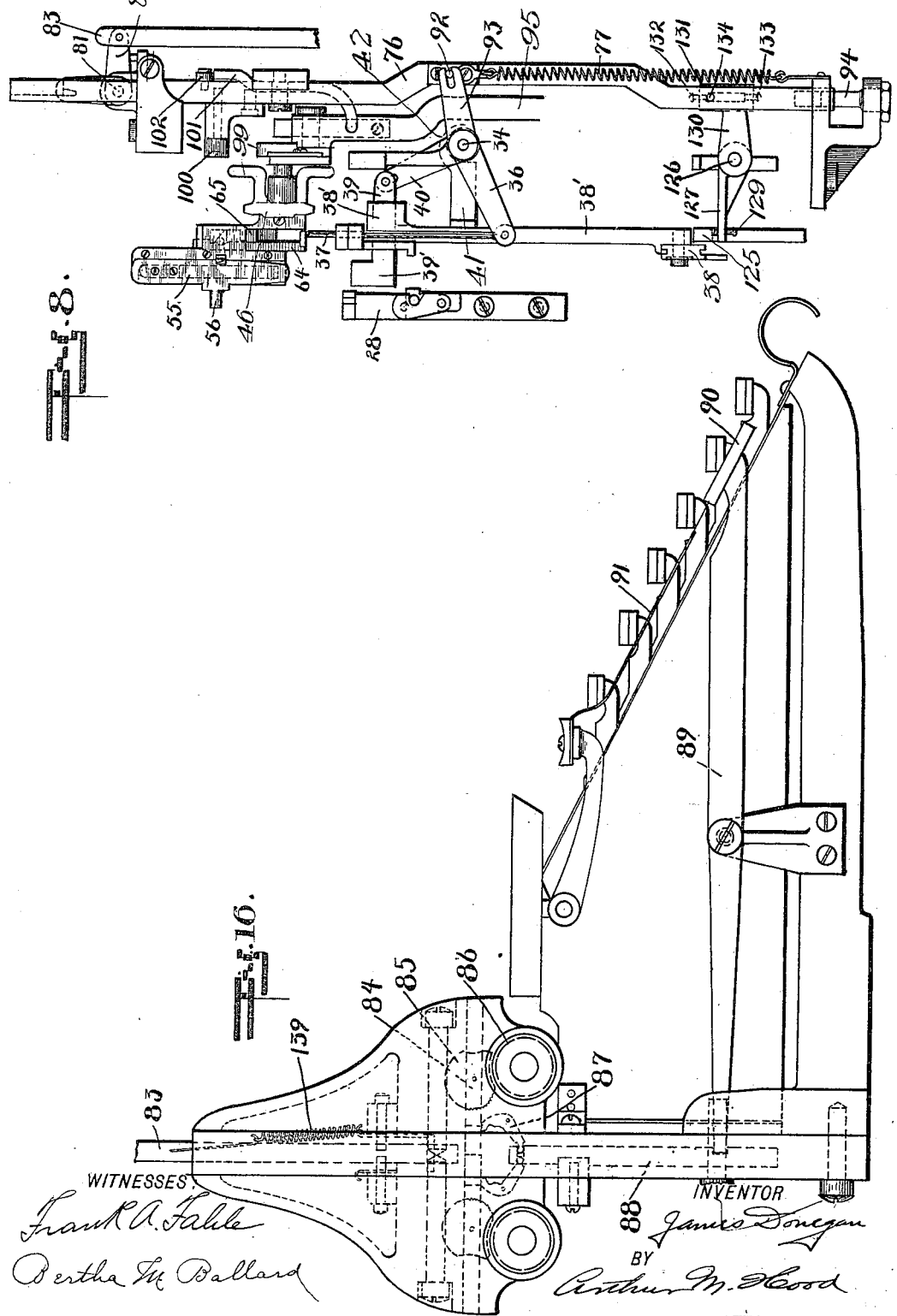

No. 666,412. Patented Jan. 22, 1901.
J. DONEGAN.
LINOTYPE MACHINE.
(Application filed Aug. 4, 1899.)
(No Model.) 10 Sheets—Sheet 7.
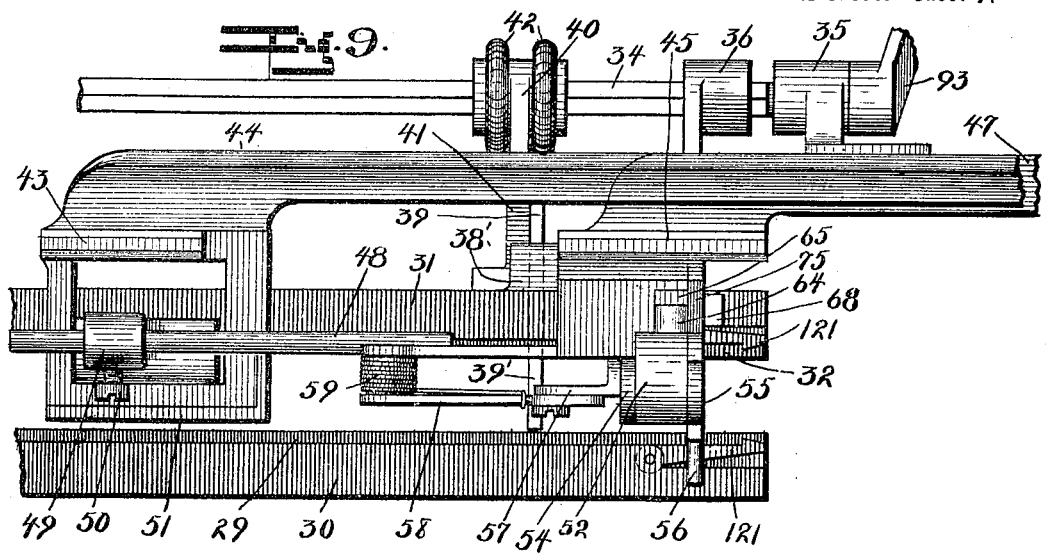
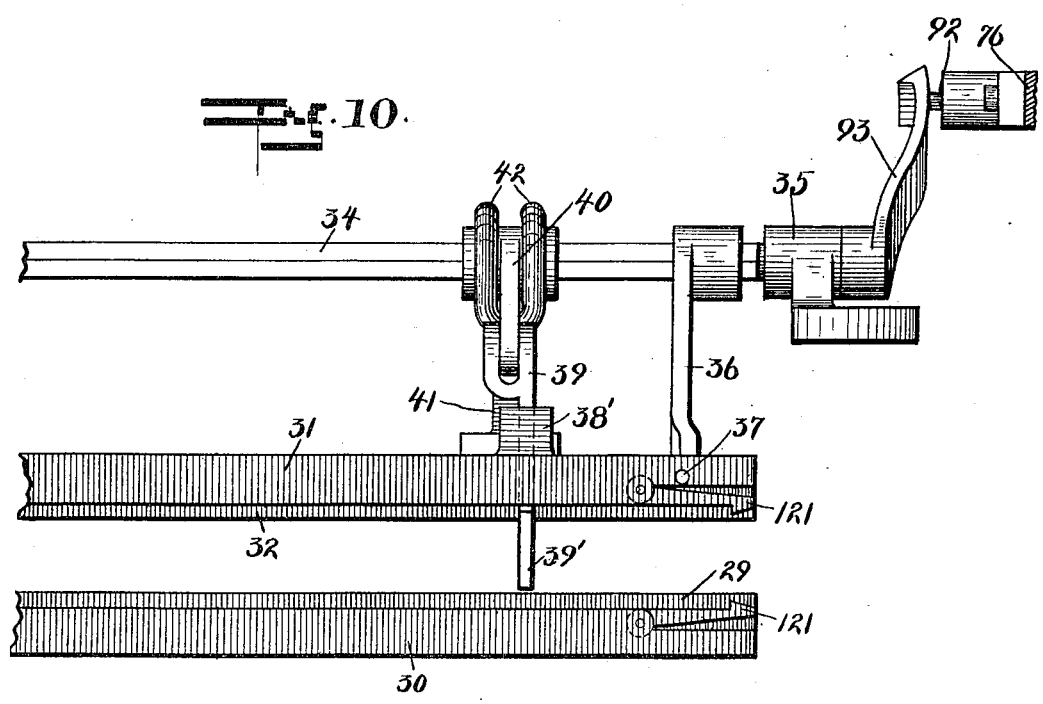

No. 666,412. Patented Jan. 22, 1901.
J. DONEGAN.
LINOTYPE MACHINE.
(Application filed Aug. 4, 1899.)
(No Model.) 10 Sheets—Sheet 8.
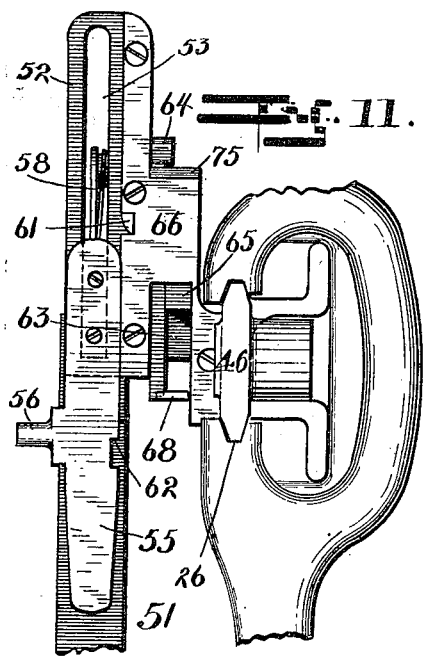
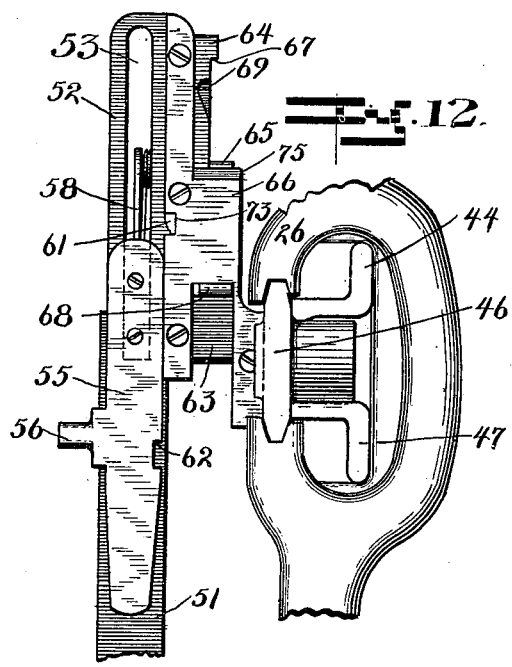
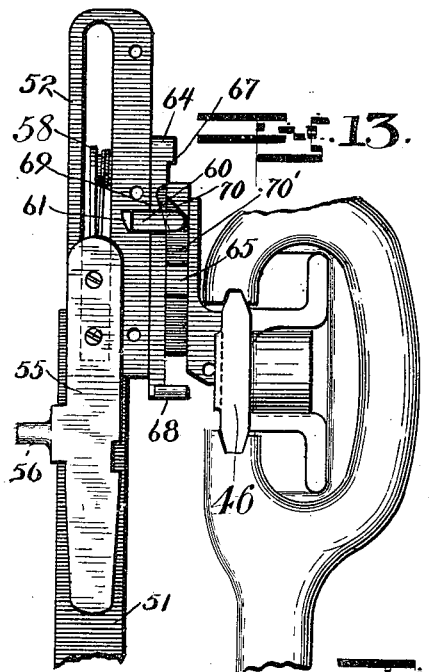
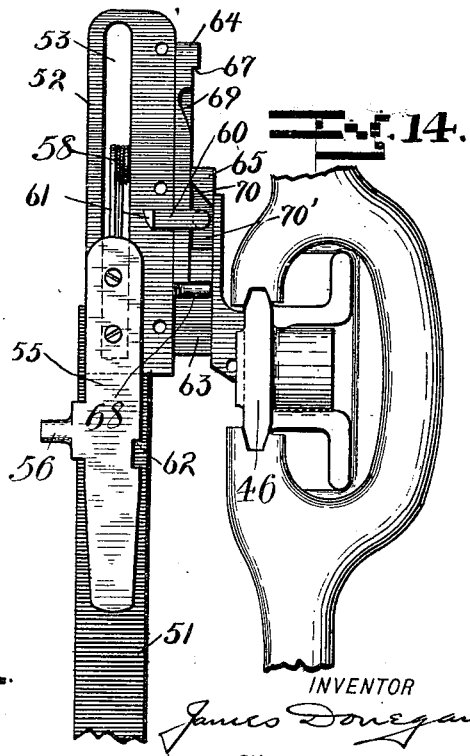
WITNESSES:
Frank A. Fable
Bertha H. Dallas
INVENTOR
James Donegan
BY
Arthur M. Hood
ATTORNEY.
THE NORRIS PETERS CO., PHOTO-LITHO., WASHINGTON, D. C.

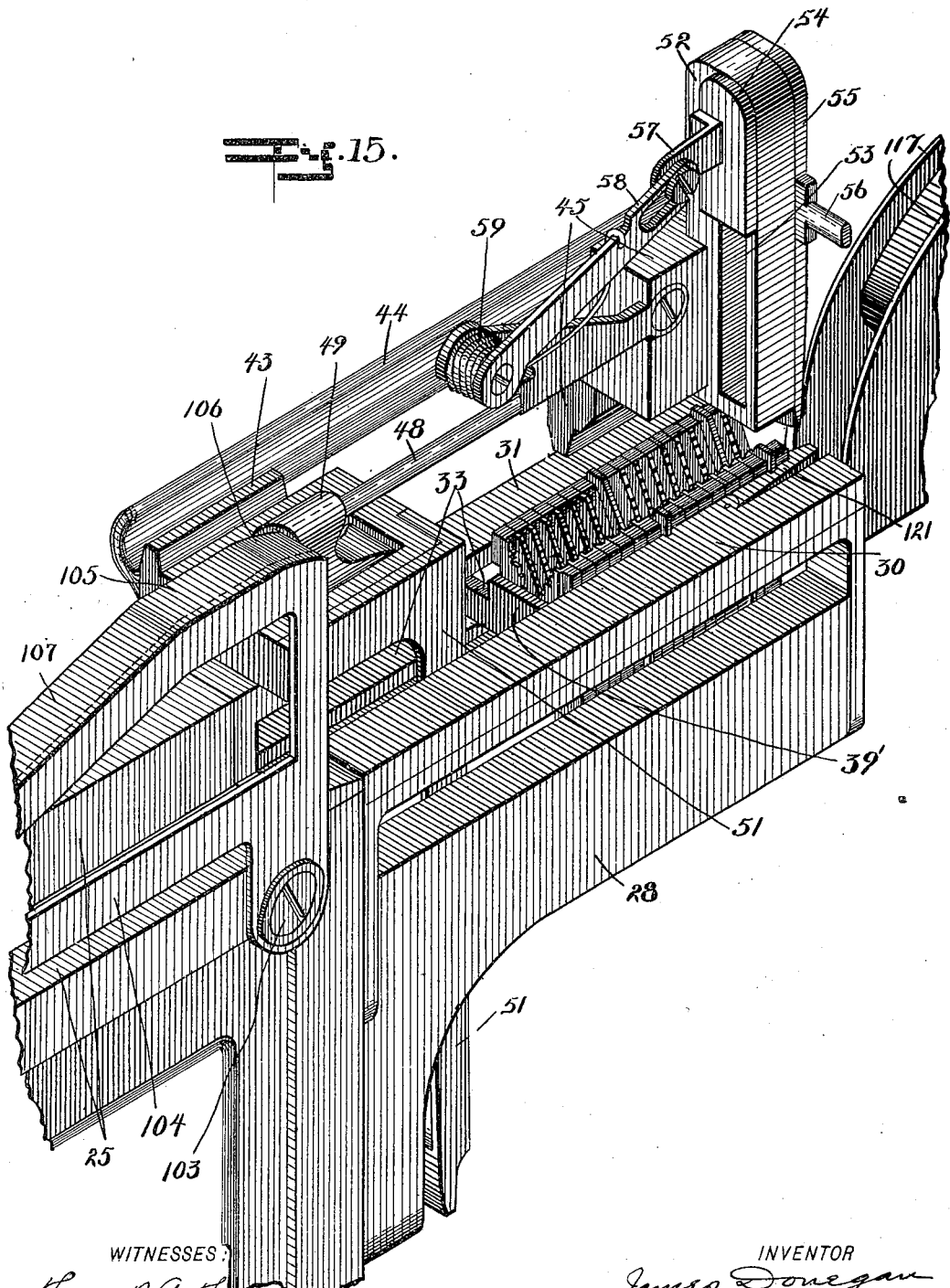

No. 666,412.  
J. DONEGAN.  
LINOTYPE MACHINE.  
(Application filed Aug. 4, 1899.)  
Patented Jan. 22, 1901.
(No Model.)
10 Sheets—Sheet 10.
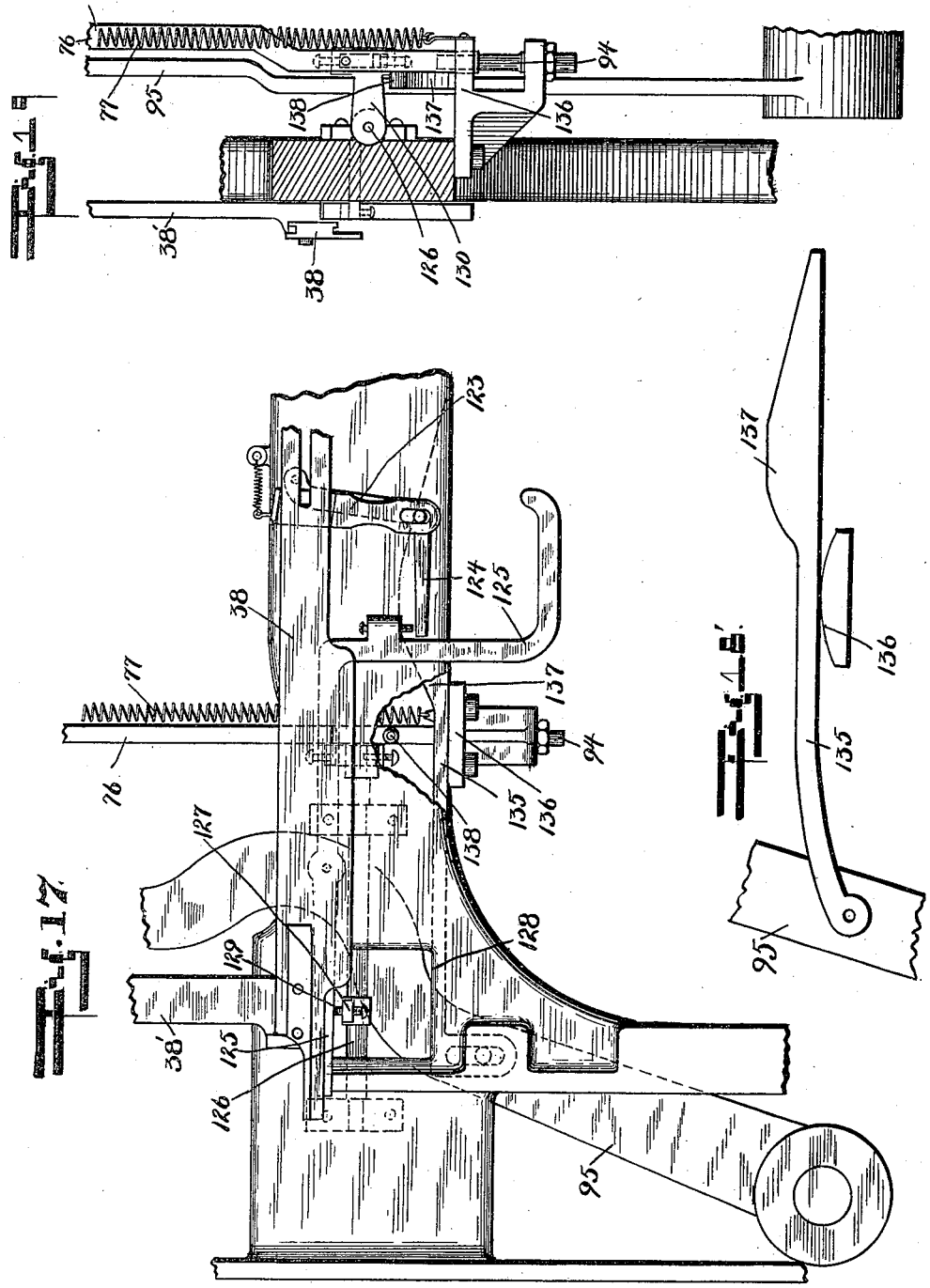
WITNESSES:  
INVENTOR  
ATTORNEY.

UNITED STATES PATENT OFFICE.

JAMES DONEGAN, OF LAFAYETTE, INDIANA.

LINOTYPE-MACHINE.

SPECIFICATION forming part of Letters Patent No. 666,412, dated January 22, 1901.

Application filed August 4, 1899. Serial No. 726,103. (No model.)

*To all whom it may concern:*

Be it known that I, JAMES DONEGAN, a citizen of the United States, residing at Lafayette, in the county of Tippecanoe and State of Indiana, have invented a new and useful Linotype-Machine, of which the following is a specification.

My invention relates to an improvement in linotype-machines, and particularly to that class of machines shown and described in the following United States Letters Patent: Nos. 436,531 and 436,532, dated September 16, 1890; No. 531,266, dated December 18, 1894; No. 557,000, dated March 24, 1896, and No. 565,487, dated August 11, 1896, all issued to O. Mergenthaler.

In the Mergenthaler machines as now placed upon the market and as illustrated in the patents before mentioned a series of matrices is delivered in proper sequence to a vertically-movable assembler-box, which when filled is raised vertically by the operator, so as to deliver the line of matrices between a pair of depending fingers carried by and forming a part of a reciprocating line-carriage, by means of which the line of matrices is delivered to what is known as the "first elevator." After the line of matrices has been delivered to the line-carriage the assembler-box is returned to its initial position and the operator begins to assemble another line of matrices. Composition cannot be resumed, however, until the assembler-box has been lowered to its initial position. In the operation of machines of this class a rapid operator loses time in two places—first, in the necessary motion and time required to raise the assembler-box to the line-carriage, and, second, in waiting the return of the assembler-box to its initial position.

One object of my present invention is therefore to provide improved mechanism for receiving the lines of matrices, said mechanism being of such character that there will be no appreciable loss of time between the completion of the assemblage of one line and the assemblage of the following line and of such character that the operator may be assembling one line while the preceding line is being delivered to the first elevator. To this end I have done away with the movable assembler-box and have rigidly secured to the intermediate channel a similar box at the point corresponding to the highest point of the original box and have made such changes in the line-carriage and its operating mechanism as to produce the result desired.

A further object of my invention is to produce means on the keyboard for releasing the line-carriage, the said means being similar to the keyboard means for releasing the matrices.

The accompanying drawings illustrate my invention.

Figure 1 is a front elevation of my improved line-carriage and the adjacent parts. Fig. 2 is a front elevation showing the relation to the first elevator. Fig. 3 is a front elevation showing the relation to the matrix-delivery belt. Fig. 4 is a front elevation of the matrix-delivery belt and adjacent parts. Fig. 5 is an end elevation of the parts shown in Fig. 4. Fig. 6 is a front elevation of my improved line-carriage separated from the frame. Fig. 7 is a similar view showing the retaining-finger dropped down into position to engage the line of matrices. Fig. 8 is an end elevation of the line-carriage and adjacent parts, the frame of the machine having been omitted. Fig. 9 is a plan, on an enlarged scale, of the line-carriage and assembler-box. Fig. 10 is a plan of the assembler-box and coöperating assembler-finger. Fig. 11 is an end elevation, on an enlarged scale, of the line-carriage, the parts being in the position in which the retaining-finger has just been released and allowed to drop. Fig. 12 is a similar view showing the position of the parts to cause the release of the line-carriage. Fig. 13 is a similar view, the face-plate having been removed. Fig. 14 is a similar view with the face-plate removed. Fig. 15 is a perspective view of my improved line-carriage and assembler-box. Fig. 16 is an end elevation of the keyboard. Fig. 17 is a view similar to Fig. 1, showing a modified form of means for returning the plunger-rod to its normal position. Fig. 18 is another modified form. Fig. 19 is a transverse section of Fig. 17. Fig. 20 is a perspective view of the face-plate 66, showing the under face thereof. Fig. 21 is a perspective view of the catch 60.

In the drawings I have shown my improved device applied to a Mergenthaler linotype-machine such as is usually found in the open market and such as is described in the patents heretofore mentioned.

In the drawings, 25 indicates the intermediate channel, 26 the line-carriage guide or channel, and 27 the first elevator, all of which are of the well-known form. Rigidly secured to the receiving side of the intermediate channel is an assembler-box 28. The front of said box is the usual frame provided with a shelf 29, upon which the matrices rest, and the hinged upper bar 30. The rear side 31 of box 28 is provided with the usual shelf 32, which corresponds with the shelf 29 and is provided with a longitudinal slot 33 between top of said bar and shelf 32. To the rear of the assembler-box and parallel therewith is a square shaft 34, which is rotatably mounted in suitable bearings 35, secured to the main frame of the machine. Secured to the right-hand end of shaft 34 is an arm 36, and pivoted to the outer end of arm 36 is the lower end of a releasing-pin 37, which is vertically movable through an opening formed in the right-hand end of part 31 of the assembler-box, the said pin projecting some distance above the upper face of said box. In order that pin 37 may not be cramped by the swinging movement of the arm 36, a slotted connection of the usual form may be made between said arm and pin, as shown. Secured to the outer end of the usual assembler-slide 38 is an upright 38', the upper end of which is provided with a slot, through which is transversely movable the arm 39 of the assembler-finger 39', the said arm projecting through slot 33 of the assembler-box. Slot 33 is sufficiently wide to allow the entrance of finger 39'. Pivoted to the inner end of the arm 39 by a suitable connection is the outer end of an arm 40, which is longitudinally movable upon and rotatable with shaft 34. In order to insure the longitudinal movement of arm 40 upon shaft 34 without becoming cramped thereon, I secure to upright 38' an arm 41, the outer end of which is provided with a pair of fingers 42, which straddle arm 40 and embrace the hub thereof. The arrangement is such that as the assembler-slide 38 is advanced in the usual manner the assembler-finger 39' will be advanced within the assembler-box and arm 40 will also be similarly advanced along shaft 34.

*The line-carriage.*—Longitudinally movable within the line-carriage channel 26 is a pair of heads 43 and 43', which are connected by bar 44. A similar pair of heads 45 and 46 is also mounted in the channel and connected by bar 47. Head 45 lies between the heads 43 and 43', and head 46 lies to the rear of 43'. Secured to head 45 is a rod 48, which projects through stud 49, carried by head 43, and said rod 48 is adjustably secured within said stud by a clamping-screw 50. Secured to head 43 is the long finger 51 of the line-carriage, said finger being preferably of the form shown in my pending application, Serial No. 706,444.

Secured to the head 45 is an upright 52, provided with a vertical slot 53, in which is vertically movable a cross-head 54. Secured upon the rear side of cross-head 54 is a retaining-finger 55, the lower end of which should be slightly beveled upon its rear face, so that the lower end thereof will be quite thin. Projecting from the front edge of finger 55 is a pin 56, the purpose of which will appear. Secured to the forward face of the cross-head 54 is an arm 57, to which is pivotally connected the slotted end of an arm 58, which is pivoted to an extension formed upon rod 48. A spring 59 is provided to engage arm 58 and normally force said arm downward.

The retaining-finger 55 is normally held in its upper position against the action of the spring 59 by means of a catch 60, the head 61 of which is adapted to engage a shoulder formed by means of a notch 62, which is cut in the back edge of finger 55. Formed in the rear or right-hand face of upright 52 is a vertical channel 63, in which is mounted a pair of cam-slides 64 and 65. Said slides are equal in thickness to the depth of the channel and are held in place by means of a face-plate 66. Slide 65 is considerably shorter than slide 64 and may be forced downward by means of the shoulder 67, formed upon the upper end of the adjacent face of slide 64. The lower end of the slide 65 may be engaged by foot 68, formed upon the lower end of slide 64. Formed in that face of slide 64 which lies immediately beneath the face-plate is a cam-notch 69, which is adapted to register with the cam-shoulder 70, formed upon the similar face of slide 65, the said cams registering when both slides are in their lowest positions. Catch 60 is provided at its inner end upon its under face with a short cylindrical stud 71. Stud 71 lies within a recess 70', formed in slide 65 beneath shoulder 70, and said recess is of such length that slide 65 may be given its limited upward movement without disturbing catch 60. In order to maintain the vertical position of catch 60, the top of said catch is mounted so as to slide transversely within a groove 72, formed in the inner face of face-plate 66, the head 61 of said catch lying when the catch is withdrawn within the notch 73, formed in that edge of the face-plate 66 which lies adjacent the retaining-finger 55.

The line-carriage is held in its matrix-receiving position at the extreme right of its travel by means of the usual spring-pressed pawl 74, which is pivoted upon the main frame. The free end of the pawl 74 engages a shoulder 75, formed upon the face-plate 66, the said free end lying immediately above the upper end of cam-slide 65.

Lying back of the main frame of the machine is a vertically-movable plunger-rod 76, upon which a downward pull is maintained by means of a spring 77. Plunger 76 is normally held in its upper position by means of a head 78, formed at its upper end. Said head is engaged and supported by means of a pin 79, which is carried at the outer end of an arm 80, mounted upon a rock-shaft 81. Secured to shaft 81 is an arm 82, to the outer end of which is pivoted the upper end of a rod 83. The lower end of rod 83 is arranged to be engaged by the usual cam-lever 84, carrying the usual cam 85, which is adapted to be dropped into engagement with the usual continuously-rotating drum 86. Cam-lever 84 is normally held so as to hold cam 85 out of engagement with drum 86 by means of a pivoted catch 87 which in turn may be thrown so as to release the cam-lever by means of the vertically-movable keyboard 88. In order to release the plunger 76, I pivot to the side of the usual keyboard a carriage-releasing key 89, the forward end 90 of which is brought just below and in front of the usual space-band key 91.

The plunger 76 is provided at a point opposite shaft 34 with a pin 92, which engages the outer end of an arm 93, carried by shaft 34. The downward movement of plunger 76 may be regulated by means of an adjustable screw 94 in the framework. The upper end of screw 94 is preferably of such size as to enter a socket formed in the plunger 76, (shown in dotted lines of Fig. 9,) the upper end of the screw engaging the inner end of the socket when the plunger-rod drops. This arrangement prevents any dirt from getting between the screw and plunger-rod and thus altering the movement of the plunger-rod.

The line-carriage is moved back and forward in its channel or guide by means of the operating-lever 95, which is of the usual well-known form, the upper end of said lever being connected to the line-carriage by means of the usual link 96. The right-hand end of the link 96 is pivoted in the usual manner to the stud 97, carried by the head 46 of the line-carriage. The usual air-cylinder rod is also secured to this stud 97.

In order to return plunger 76 to its normal upper position, I secure to link 96 a cam 99, which is adapted to be brought into engagement by movement of lever 95 with a pin or roller 100, carried by said plunger 76. In order to make sure that the plunger-rod is held up after being moved up by cam 99 and in case for any reason pin 79 should fail to pass under head 78, I provide a precautionary catch 101, which is pivoted to the main frame adjacent plunger 76. The upper end of catch 101 is adapted to pass under a roller or pin 102, carried by plunger 76 when said plunger is in its upper position. Catch 101 is of such form, however, that when lever 95 is in the position shown in Fig. 2 the said lever will engage the lower end of the catch and throw its upper end out of engagement with pin 102; but the said catch is so balanced that when lever 95 is moved to the left (see Fig. 2) the upper end of the catch will drop down into the path of movement of said roller.

In order to return the matrix-retaining finger 55 to its normal upper position, I pivot at 103 to the intermediate channel 25 a plate 104, which carries upon its inner face a flange 105. The right-hand end 106 of said flange is given a slight drop, while the left-hand end 107 of said flange is a long incline, as shown, extending from the top of the plate 104, which lies just below the normal position of pin 56 to the upper side of the intermediate channel. Portion 106 is provided so as to allow the shoulder 62 to drop gently into engagement with head 61 of catch 60. The elevator end of plate 104 may be held in position by means of a pin 108, passing through slot 109, formed in said plate.

Pivoted to the main frame immediately above the path of movement of the upper end of cam-slide 64 is a spring-pressed finger 110, which is so arranged as to insure the proper return of said slide to its lower position, and consequently return the catch 60 to position to engage shoulder 62 of the matrix-retaining finger 55.

*The matrix-delivery belt.*—In the present Mergenthaler machine the matrices are delivered from the reservoir (not shown) through a series of channels 112 to a continuously-moving belt 113, which belt is passed around a driving-pulley 114 and an idler 115. My present invention having been made to attach to existing Mergenthaler machines, it became necessary to shorten the delivery-channels 112 and insert a second idler 116, over which belt 113 is passed. Lying adjacent this idler 116 and in position to receive the matrix from the belt as it passes from said idler are the matrix-slides 117, which are of the usual form, but are preferably formed of steel instead of fiber. Each slide 117 is provided at its lower end with a toe 118, the upper face of which will lie slightly above the receiving end of the corresponding shelf 29 or 32 of the assembler-box. Revolubly mounted between the lower ends of the matrix-slides 117 is a three-wing star-wheel 119, which is driven by a suitable train of gears 120 between its shaft and driving-pulley 114. The matrices after having been introduced into the assembler-box are retained therein in the usual manner by means of the spring-dogs 121, one of which is mounted on each side of the receiving end of the assembler-box.

The assembler-slide 38 is maintained in its step-by-step advancement against the action of the usual return-spring by means of the usual brake 123, said brake being released by levers 124 and 125. In order to properly operate lever 125 from plunger 76, I mount to the rear of the framework a rock shaft 126. Secured to the shaft 126 is an arm 127, which projects through an opening 128 in the framework. In the free end of arm 127 I mount an adjusting-screw 129, which is adapted to engage the adjacent end of the lever 125. Also secured to shaft 126 is an arm 130, which carries at its outer end a cross-head 131. (Shown in dotted lines in Fig. 8.) The length of the opening in cross-head 131 may be regulated by means of screws 132 and 133. Carried by plunger 76 is a pin 134, which projects into the opening in cross-head 131 and is adapted to play between screws 132 and 133.

A number of desirable means for returning plunger 76 to its normal upper position will readily suggest themselves, and in Figs. 18 and 19 I have shown a modification. In this form I provide a cam-slide 135, which rests upon a portion 136 of the frame near the lower end of plunger 76. Cam-slide 135 is provided with a head 137, which is provided with suitable inclined faces adapted to engage a roller 138, carried by the adjacent portion of the plunger 76. Slide 135 is connected by a pin-and-slot connection (shown in dotted lines in Fig. 17) to the operating-lever 95, the arrangement being such that after plunger 76 has dropped a movement of lever 95 will cause head 137 on slide 135 to come into engagement with roller 138, and thereby force plunger 76 upward to its normal position. Instead of a pin-and-slot connection between slide 135 and lever 95 the said slide may be directly pivoted to the lever, as shown in Fig. 18', in which case the upper portion 136 should preferably be rounded, as shown.

*The operation.*—The parts are normally in the position shown in Figs. 1 and 3, with the exception that the assembler-slide, together with the upright 38' and assembler-finger 39', carried thereby, lies slightly to the right, with the assembler-finger 39' in position to form an abutment for the first and succeeding matrices. With the various moving portions of the machine in motion in their usual directions the operator operates the keys of the keyboard in the usual manner, thus releasing the matrices in proper sequence, which matrices are successively delivered by belt 113 to the slides 117, down which slides the matrices drop into engagement either with the wings of the star-wheel 192 or the toes 118 of said slide and are forced by said star-wheel into the assembler-box, so as to rest upon shelves 29 and 32 in the usual well-known manner. The space-bands are also introduced into the assembler-box in proper order in the usual manner from the usual space-band box. As the matrices are introduced in succession into the assembler-box the assembler-finger 39' recedes step by step with the assembler-slide and arm 40 slides along shaft 34. The assembler-finger 39' should be quite thin, and it continues to recede before the incoming matrices until it and the assembler-slide come into engagement with the long finger 51 of the line-carriage, the assembler-box at that time having received its full quota of matrices. As soon as this occurs the operator touches key 89, and thus through key-rod 88 and pawl 87 releases cam-lever 84. As soon as cam-lever 84 is released cam 85 is dropped down into engagement with revolving drum 86 and in the usual manner moves rod 83 upward. The upward movement of rod 83 swings shaft 81, and this withdraws pin 79 of arm 80 from beneath head 78 of the plunger-rod 76. As soon as this is done rod 76 is pulled down by means of spring 77 and by means of pin 92 rocks shaft 34. The rocking of shaft 34 causes through arm 40 the withdrawal of the assembler-finger 39' from engagement with the matrices and out of the assembler-box. Just as the assembler-finger is being withdrawn from the assembler-box pin 37 by means of arm 36 is brought into engagement with foot 68 of the cam-slide 64 and a continued movement of the shaft causes a relative movement between the cam-notch 69 and cam-shoulder 70, thus drawing catch 60 into the position shown in Fig. 14, its head 61 being withdrawn from shoulder 62 of the retaining-finger 55. As soon as the withdrawal of the catch 60 is accomplished the retaining-finger 55 is immediately thrown downward by the action of the spring 59 and arm 58 until its lower end lies adjacent the line of matrices in the assembler-box, the line of matrices being thus imprisoned between the long finger 51 and the retaining-finger 55 of the line-carriage. The continued drop of the plunger 76 causes a further upward movement of the cam-slide 64 until the foot 68 thereof comes into engagement with the lower end of cam-slide 65 and causes a sufficient movement thereof to bring its top above the upper edge of shoulder 75. This movement of slide 65 brings its upper end into engagement with pawl 74, and thus releases the line-carriage, which is then immediately advanced through the assembler-box and intermediate channel to the first elevator by means of the usual spring-actuated lever 95. As has already been stated, the action of plunger 76 after it has been released and is being drawn down by spring 77 is to withdraw assembler-finger 39' from engagement with the matrices, to release retaining-finger 55, and to disengage pawl 74 from engagement with shoulder 75. While these actions are taking place, plunger 76 has moved through a distance sufficient to carry pin 134 the length of the opening in cross-head 131 between screws 132 and 133. As soon as pin 134 engages screw 133 shaft 126 is turned by the further downward movement of plunger 76, and thus brings screw 129 into engagement with the lever 125, which lever engages lever 124, and thus moves brake 123, so as to release the assembler-slide 38. As soon as slide 38 is released, it, together with the assembler-finger 39', is returned by spring 122 to its normal position, arm 40 being at the same time returned along shaft 34. When the line-carriage, with its line of matrices, has advanced a short distance, cam 99 is, through the combined action of the lever 95 and link 96, brought into engagement with roller 100 of the plunger 76, and the action of said cam is such as to raise the plunger-rod to its normal upper position, where it is retained by pin 79, said pin being automatically returned beneath head 78 by means of the usual spring 139 acting upon bar 83. In order to prevent pin 79 from being returned to its normal position when plunger 76 is down, the head 78 is elongated, as shown in Fig. 9, so that when the plunger is down pin 79 is held against the vertical side of head. When the plunger 76 begins to be raised by cam 99, the line-carriage has advanced sufficiently to carry the retaining-finger 55 beyond the return position of the assembler-finger, and as soon as the plunger begins to rise shaft 34 is returned to its normal position and finger 39' is advanced into the assembler-box and pin 37 drawn down to its normal position. Just at the close of the upward movement of the plunger 76 pin 134 is brought into engagement with screw 132, thus swinging shaft 126, so as to allow the return of lever 125 and brake 123 to their normal positions in the usual manner. As soon as the line-carriage, with its line of matrices, has been released and the assembler-finger returned to its initial position the operator need pay no further attention thereto, but may resume composition. As a matter of fact the assembler-finger is returned to its matrix-receiving position by the time the line-carriage has advanced less than two inches, so there is no appreciable loss of time in composition. In the meantime the line-carriage has advanced through the intermediate channel, and pin 56 of the retaining-finger 55 passes beneath part 107 of the flange 105 on plate 104, the said pin thus swinging the plate upward. The line comes to rest in the usual manner in position to deliver its line of matrices to the first elevator, and as soon as such delivery has been accomplished the line-carriage is started upon its return movement in the usual manner. As it returns, pin 56 on finger 55 passes over, instead of under, flange 107 and is thereby forced upward until it reaches the portion 105 of said flange, in which position the finger 55 has been returned to its upper normal position. At the same time the upper end of cam-slide 64 is passing beneath cam 110 and is thereby forced downward to its extreme position, shoulder 67 of said plate engaging the upper end of cam-slide 65, and thus forcing the cam-shoulder 70 thereof against stud 71 of the catch 60 and forcing said catch outward until it lies partly within notch 69 and its head 61 is thrown into position to engage shoulder 62, and thus support finger 55.

During the process of casting and the return of the line-carriage to its initial position the operator has had sufficient time to assemble another line of matrices, and upon pressing key 89, as already described, the operation of the line-carriage and other parts is repeated and may be indefinitely continued.

In adapting my invention to the existing Mergenthaler machines it becomes necessary to raise slightly some of the parts which lie above the line-carriage channel, said parts including, among others, the space-band box and adjacent parts, and to slightly alter the shape of various cams; but the shifting and alteration of these parts does not materially alter their operation or function.

I claim as my invention—

1. In a linotype-machine, the combination with the assembler-box, of an assembler-finger adapted to traverse said box, a line-carriage also adapted to traverse said box, means for withdrawing the assembler-finger from said box and out of contact with the matrices as soon as the line has been assembled, and means for returning said assembler-finger to its initial position during the forward traverse of the line-carriage.

2. In a linotype-machine, the combination with the matrix-elevator, of an assembler-box mounted in line with the matrix-receiving position of said elevator, an assembler-finger adapted to traverse said assembler-box, means for withdrawing said finger from said box and from contact with the matrices as soon as the line has been assembled, a line-carriage adapted to traverse said assembler-box and to carry the matrices from said box to the elevator, and means for returning the assembler-finger to its initial position during the forward traverse of the line-carriage.

3. In a linotype-machine, the combination with the assembler-box, of an assembler-finger arranged to traverse said box, a line-carriage also arranged to traverse said box, means for withdrawing said finger from said box and from contact with the matrices as soon as the line has been assembled, means for causing said carriage to engage matrices placed in said box, means for driving the line-carriage through said box, and means for returning the assembler-finger to its initial position in said box.

4. In a linotype-machine, the assembler-box, an assembler-finger adapted to traverse said box longitudinally, means for transversely withdrawing said finger from said box and from engagement with the matrices, means for returning said finger longitudinally outside of said box, and means for returning said finger transversely to its initial position.

5. In a linotype-machine, an assembler-box, a line-carriage adapted to traverse said assembler-box longitudinally, a finger carried by said carriage and extending into said box, a retaining-finger carried by said carriage and transversely movable with relation to said box, means for normally holding said retaining-finger out of said box, means for automatically releasing said finger and line-carriage, and a key for throwing said releasing means into action.

6. In a linotype-machine, the combination with an intermediate channel and assembler-box mounted in line of channel, of a line-carriage mounted in suitable ways, a finger carried by said carriage lying within and adapted to traverse longitudinally said assembler-box and channel, a retaining-finger carried by said line-carriage and transversely movable with relation to said assembler-box, means for normally holding said retaining-finger out of the assembler-box, means for holding the line-carriage in the matrix-receiving position, means for automatically projecting said retaining-finger into the assembler-box, means for withdrawing said retaining-finger from the line of the assembler-box, means for automatically releasing the retaining-finger and the line-carriage, and a key for throwing said automatic means into operation.

7. In a linotype-machine, the combination with the intermediate channel, of an assembler-box mounted in line therewith, an assembler-finger arranged to traverse said box longitudinally, means for withdrawing said assembler-finger from said box and from contact with the matrices when the line has been assembled, a line-carriage arranged to traverse the assembler-box and intermediate channel and to propel the matrices therethrough, and means for returning the assembler-finger to its initial position within the assembler-box during the forward movement of the line-carriage.

8. In a linotype-machine, the combination with the intermediate channel, of an assembler-box mounted in line therewith, an assembler-finger arranged to traverse said box longitudinally, means for withdrawing said assembler-finger from said box and from engagement with the matrices as soon as the line has been assembled, a line-carriage arranged to traverse the assembler-box and intermediate channel and to propel the matrices therethrough, and means for returning the assembler-finger to its initial position within the assembler-box during the forward movement of the line-carriage.

9. In a line-carriage for linotype-machines, a retaining-finger carried thereby and movable transversely to the direction of movement of the line-carriage, a catch for maintaining said retaining-finger in its outer position, means for withdrawing said catch, and means for propelling said finger to its inner position.

10. In a line-carriage for linotype-machines, a transversely-movable matrix-retaining finger carried thereby, a catch for maintaining said finger in its outer position, a pair of cam-slides 64 and 65 carried by the line-carriage, one of said slides having a longer movement than the other, means carried by said slides for moving said catch out of and into engagement with the retaining-finger, and means for propelling said retaining-finger to its inner position.

11. In a linotype-machine, the combination with the assembler-box, of a line-carriage consisting of a stationary finger extending into and adapted to traverse the assembler-box, a matrix-retaining finger movable transversely with relation to the assembler-box, means for holding the line-carriage in its matrix-receiving position, and automatic means for first releasing the retaining-finger and afterward releasing the line-carriage, and a keyboard means for throwing said releasing means into operation.

12. In a linotype-machine, the combination with the assembler-box, of a line-carriage consisting of a stationary finger extending into and arranged to traverse the assembler-box, a matrix-retaining finger movable transversely with relation to the assembler-box, means for holding the line-carriage in its matrix-retaining position, means for first releasing the retaining-finger and afterward releasing the line-carriage; an assembler-finger arranged to traverse the assembler-box between the two fingers of the line-carriage, and means for withdrawing said assembler-finger transversely from the assembler-box and from engagement with the matrices.

13. In a linotype-machine, the combination with the assembler-box, of a line-carriage consisting of a stationary finger extending into and arranged to traverse the assembler-box, a matrix-retaining finger movable transversely with relation to the assembler-box, means for holding the line-carriage in its matrix-receiving position means for first releasing the retaining-finger and afterward releasing the line-carriage; an assembler-finger arranged to traverse the assembler-box between the two fingers of the line-carriage, means for withdrawing said assembler-finger transversely from the assembler-box and from engagement with the matrices, means for propelling the line-carriage through the assembler-box to its delivery position, means for simultaneously returning the assembler-finger longitudinally outside of the assembler-box, and means for projecting said assembler-finger transversely into said box to its initial position.

14. In a linotype-machine, the combination with the assembler-box, of a line-carriage movable parallel to the axis of the assembler-box and consisting of the following parts, a finger mounted so as to travel longitudinally within the assembler-box, a retaining-finger transversely movable with relation to the axis of the assembler-box, means for propelling said retaining-finger into the assembler-box, a catch for normally holding said retaining-finger out of the assembler-box, and a pair of cam-slides arranged to engage said catch, one of said slides having a longer throw than, and adapted to engage and propel, the other slide; a catch mounted with its free end above the shorter cam-slide in position to engage the line-carriage and maintain it in its matrix-receiving position, and means for moving the first cam-slide whereby the retaining-finger will be released before the line-carriage is released.

15. In a linotype-machine, the combination with the assembler-box, of an assembler-finger mounted so as to traverse said box longitudinally, a rock-shaft, an arm longitudinally movable on said shaft but rotatable therewith, a connection between said arm and assembler-finger, and means for rocking said shaft whereby said assembler-finger may be withdrawn in a right line transversely from the assembler-box.

16. In a linotype-machine, the combination with the assembler-box, of an assembler-slide movable substantially parallel with the axis of the assembler-box, an assembler-finger projecting into said assember-box and transversely movable in said slide, a rock-shaft, an arm longitudinally movable on said shaft but rotatable therewith, a connection between said arm and assembler-finger, a second arm secured to said rock-shaft, a plunger-rod, a connection between said plunger-rod and said arm, means for holding said plunger-rod in position to maintain the assembler-finger within the assembler-box, and means for releasing said plunger-rod so as to withdraw the assembler-finger from said assembler-box.

17. In a linotype-machine, the combination with the assembler-box, of an assembler-finger longitudinally movable within the assembler-box, a rock-shaft, an arm longitudinally movable on said rock-shaft but rotatable therewith, a connection between said arm and assembler-finger, means for normally returning the assembler-finger longitudinally to its initial position, a brake or catch for preventing the return of said assembler-finger, a plunger-rod, a connection between said plunger-rod and brake, means for holding said plunger-rod in position to maintain the assembler-finger within the assembler-box, and means for releasing said plunger-rod, the arrangement being such that, when the plunger-rod is released, the assembler-finger will be first transversely withdrawn from the assembler-box and the brake will then be released so as to allow the longitudinal return of the assembler-finger, and means for returning the plunger-rod to its normal position and thus project the assembler-finger transversely into the assembler-box and set the brake.

18. In a linotype-machine, the combination with the assembler-box, of an assembler-finger longitudinally movable within the assembler-box, a rock-shaft, an arm longitudinally movable on said rock-shaft but rotatable therewith, a connection between said arm and the assembler-finger, a plunger-rod, connections between said rod and rock-shaft, means for normally returning the assembler-finger longitudinally to its initial position, a brake or catch for preventing the return of said assembler-finger, a second rock-shaft, a sliding connection between said second rock-shaft and plunger, connections between said second rock-shaft and brake, means for holding said plunger-rod in position to maintain the assembler-finger within the assembler-box, means for releasing said plunger-rod, said means being such that, when the plunger-rod is released, the assembler-finger will be first transversely withdrawn from the assembler-box and the brake will then be released so as to allow the longitudinal return of the assembler-finger, and means for returning the plunger-rod to its initial position and thus project the assembler-finger transversely into the assembler-box and set the brake.

19. In a linotype-machine, the combination with the assembler-box, of a line-carriage having a finger arranged to lie within and traverse longitudinally said assembler-box, a retaining-finger carried by said carriage and transversely movable with relation to the assembler-box, means for maintaining said retaining-finger out of said box, means for projecting said retaining-finger into said box, an assembler-finger arranged to traverse the assembler-box longitudinally between the two fingers of the line-carriage, means for holding the line-carriage in the matrix-receiving position, means for propelling the line-carriage through the assembler-box, and means for first withdrawing the assembler-finger transversely from the assembler-box and projecting the retaining-finger transversely into the assembler-box, then releasing the line-carriage and returning the assembler-finger longitudinally and then projecting the assembler-finger transversely into the assembler-box, and means for returning the line-carriage and its retaining-finger to their initial positions.

20. In a linotype-machine, the combination with the assembler-box, of a line-carriage having a finger arranged to lie within and traverse longitudinally said assembler-box, a retaining-finger carried by said carriage and transversely movable with relation to the assembler-box, a catch for holding said finger out of said box, means for projecting said retaining-finger into said box, a pawl arranged to engage the line-carriage and hold it in its matrix-receiving position, a slide carried by the line-carriage in position to engage said pawl, a second slide carried by said carriage the said second slide being relatively movable with relation to the first slide and arranged to propel it into engagement with said pawl, means carried by said second slide for engaging and withdrawing the catch from engagement with the retaining-finger, and means for first withdrawing the assembler-finger transversely from the assembler-box and moving the second slide so as to release the retaining-finger, then causing a further movement of the said second slide so as to release the line-carriage, and means for returning the assembler-finger longitudinally and projecting it transversely into the assembler-box.

21. In a linotype-machine, the combination with the assembler-box, of a line-carriage having a finger arranged to lie within and traverse longitudinally said assembler-box, a retaining-finger carried by said carriage and transversely movable with relation to the assembler-box, a catch for holding said finger out of said box, means for projecting said retaining-finger into said box, a pawl arranged to engage the line-carriage and hold it in its matrix-receiving position, a slide carried by the line-carriage in position to engage said pawl, a second slide carried by said carriage, the said second slide being relatively movable with relation to the first slide and arranged to propel it into engagement with said pawl, means carried by said second slide for engaging and withdrawing the catch from said engagement with the retaining-finger, a rock-shaft, an arm longitudinally movable upon said rock-shaft but rotatable therewith, a connection between said arm and the assembler-finger, a plunger-rod, an arm carried by said rock-shaft, a connection between said arm and plunger-rod, another arm carried by said rock-shaft, a pin engaged by said other arm and mounted in position to engage and operate the second slide of the line-carriage when in its initial position, means for holding the plunger-rod in position to maintain the assembler-finger within the assembler-box, means for releasing said plunger-rod, means for propelling the line-carriage, means for returning the assembler-finger longitudinally, and means operated by the plunger-rod for allowing the longitudinal return of the assembler-finger.

22. In a linotype-machine, the combination with the assembler-box, of a line-carriage having a finger arranged to lie within the assembler-box and traverse said box longitudinally, a retaining-finger carried by said carriage and transversely movable with relation to the assembler-box, means for projecting said retaining-finger into said box, means for holding said finger out of said box, means for releasing said retaining-finger, a pin carried by said finger, and a cam-plate carried by the framework, the arrangement being such that, when the retaining-finger has been projected into the assembler-box and the line-carriage is advanced, the pin on the retaining-finger will pass beneath the cam of said plate, and when the line-carriage is returned, the said pin will ride over said cam and thus return the retaining-finger to its initial position.

JAMES DONEGAN.

Witnesses:
J. E. WALKER,
W. BENT WILSON.